United States Patent Office 2,742,668
Patented Apr. 24, 1956

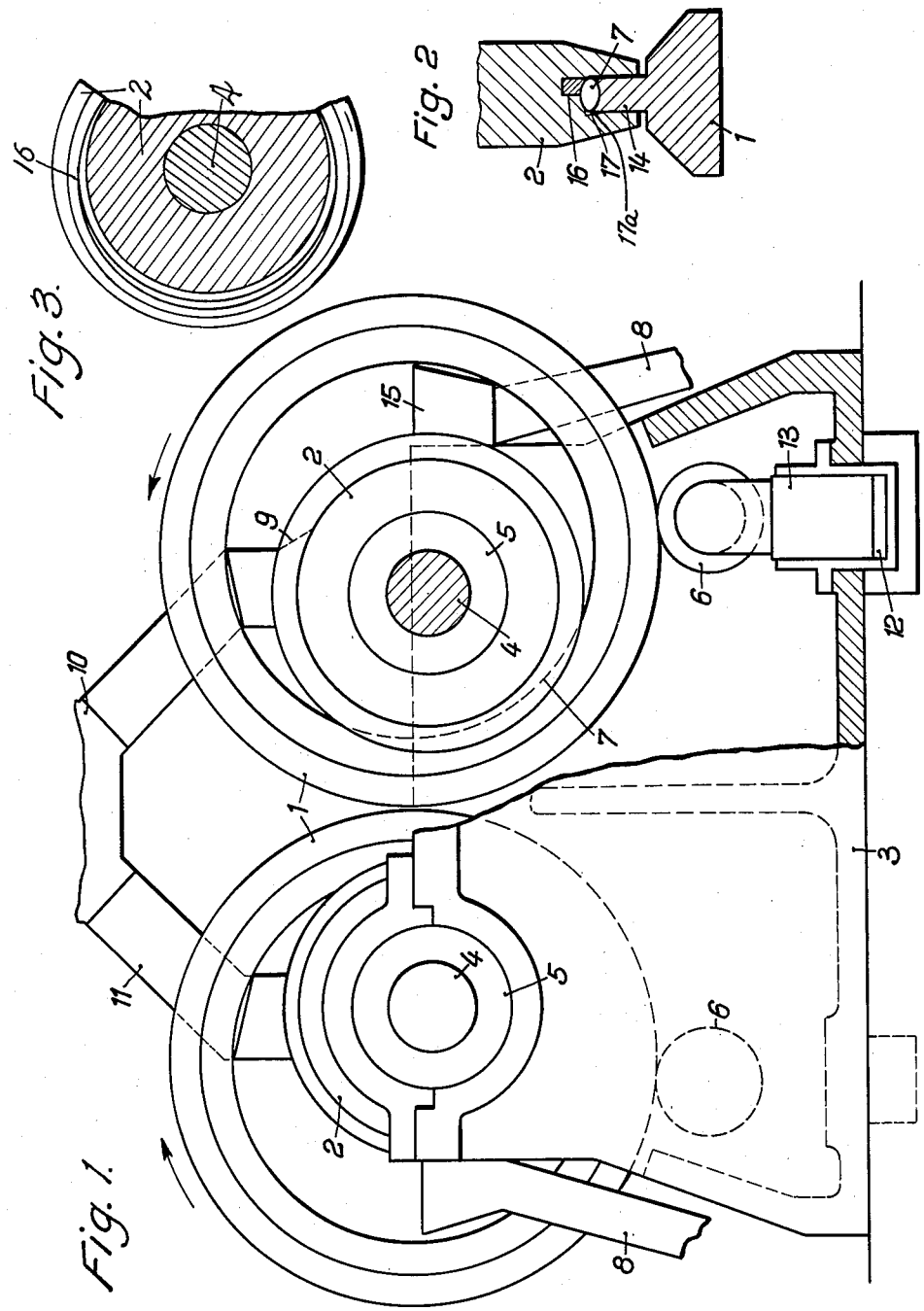

2,742,668

APPARATUS FOR THE BRIQUETTING OF DUST-LIKE OR FINE-GRAINED MATERIAL

Otto Hubmann, Bad Homburg (Taunus), Germany

Application December 2, 1950, Serial No. 198,796

Claims priority, application Germany December 19, 1949

7 Claims. (Cl. 18—9)

This invention relates to apparatus for the briquetting of dust-like or fine-grained material. Devices for the briquetting of fine-grained material such as brown coal, ores or the like are known in which the material is compressed in the groove of a ring, revolving on two or more rollers, with the aid of a pressure disc of a smaller diameter engaging in the groove. Since with such a construction, more particularly in the case of briquetting without a binder, very high pressures are exerted which have to be taken up by the bearings and rollers, it is necessary owing to the linear contact, to make the diameter of the ring and of the rollers very large in order to prevent over-loading of the working surfaces thereof. Moreover, the known construction requires at least six large roller bearings for the mounting of the pressure disc and of the rollers. The large diameter of the ring requires considerable quantities of high quality and expensive materials for its manufacture as well as expensive special machines for this purpose and for the periodic overhaul of the rings.

It is an object of the present invention to remove these difficulties.

With this and further objects in view, according to the present invention, two similar rings are used for the briquetting which mutually support each other and which rotate around two pressure discs arranged on a horizontal axis. The four rollers required in the previous construction with the same output and the eight heavy bearings which were required for their mounting are thus entirely dispensed with. The linear contact of the smaller rollers causing a high degree of wear and tear is replaced by the considerably more favourable linear contact of the large rings themselves. Therefore, four bearings for the two shafts of the two pressure discs are sufficient for a press having twice the output of the conventional construction while in the known construction twelve heavy roller bearings were required for the same output.

Moreover, owing to the more favourable contact or distribution of pressure at the point of engagement of the rings, higher pressures can be attained by the new construction, or the diameter of the rings and hence the required expenditure of material can be reduced without impairing the output and the reliability of operation of the apparatus.

The pressure exerted during the briquetting operation or compression is transmitted through the rings, the pressure discs and their bearings directly to the frame of the apparatus.

During the pressing operation the two rings are "floating" between the two fixedly mounted pressure discs. Their accurate position depends on the quantity of material supplied in the given unit of time which quantity is determined in accordance with the required pressure. With increasing pressure the rings rise slightly, whereby the maximum thickness of briquettes is obtained.

In order to adapt the power to be exerted to the properties of the material to be briquetted, according to the invention, smaller, preferably adjustable, supporting rollers are arranged on one or both of the rings in such a manner that they act upon the rings from below in a direction approximately perpendicularly to the line connecting the centre points of the rings and thus permit displacement of the ring with respect to the line connecting the centres of the fixedly mounted pressure discs. Thus only small adjusting forces are necessary for the constriction of the pressure gap between the ring and the disc. In this manner, the elastic connection between the bearings of the disc, which at the present time, are used in the construction of ring roller presses, can be omitted. If desired, of course, these elastic bearings may be retained with the advantage that, even when briquetting particularly difficult, e. g. highly elastic materials, the press will always produce uniform briquettes.

Where the supporting rollers are resiliently mounted, for instance, by springs or hydraulic pistons, the width of the pressure gap itself, in the case of a varying supply of the material, adapts itself to the variations and compression takes place with a uniform pressure and uniform quality of the briquettes. By supporting the rollers by hydraulic pistons, any desired working pressure can be provided in operation, by variation of the pressure of the hydraulic fluid, it being possible to control simultaneously the thickness of the briquettes within wide limits without change of the pressure, merely by varying the quantity of material supplied in the given unit of time.

Although the press, according to the invention, attains the capacity of two presses of known construction, it is possible with the new press to drive only one of the two pressure discs and thereby to reduce further the amount of constructional material required for making the press. By the friction of the treads and of the briquettes produced, all moving parts of the press are set in rotation at approximately the same speed, whereby a free running of the parts is achieved and the wear and tear of the treads or bearing surfaces is reduced. Even in case of a non-uniform filling of the two pressure gaps, no constraint of the movements can occur and the two pressure discs are able to adapt themselves without difficulty to differences in the number of revolutions caused by different thicknesses of the briquettes.

The grooves in which the material is compressed may be arranged interiorly of the rings or exteriorly of the pressure discs. They may be designed in known manner in the form of a double groove if the ejection of the mouldings from a single groove would cause difficulties. However, the use of a double groove leads to an increased diameter of the pressure ring. Moreover, when very high pressures are required, which for instance amount to 3000 kgs. per square centimetre, for briquetting bituminous coal without a binder, this leads, in the case of a double groove, to very high stresses at the bearings. According to a further feature of the invention a stripping tool has been developed which permits the removal of the briquettes reliably and without destruction even from a single groove. According to the invention the bottom of the groove is partly formed by a loose ring which if the groove is formed in the pressure disc, has a somewhat larger internal diameter than the bottom of the groove. Under the action of the pressure of the material this ring is pressed to the base of the groove at the portion where the briquetting pressure is applied and extends out of the base of the groove on the opposite side. On the opposite side of the pressure disc from the portion where the briquetting pressure is applied the briquettes are then ejected from the groove by the ring emerging from the base of the groove. This design permits a reduction in the diameter of the rings. Due to the smaller width of the groove compared with the double groove, substantially higher pressures can be exerted or broader and thicker briquettes can be produced with the same bearings and shafts as are used in the conventional presses, said briquettes being suitable for example for blast furnaces.

The disengagement of the mouldings from the groove may be further facilitated by arranging the loose ring in the bottom of the groove and displaced to one side thereof.

Moreover, the effect of the loose ring can be assisted by moving the briquette beyond the dead centre position when the ring begins to act, by making the groove deeper on the non-movable side, i. e. by an inclined position of the briquettes in the groove.

The disengagement of the briquettes can be effected in a still easier and more economical manner if the briquettes are held fixed in the side wall of the groove opposite to the loose ring, by a slight recess in the side wall, while the ring forces them out on the other side. Where the briquette strand is notched in known manner, the loose ring during the disengagement of the briquettes causes the strand to break at the notches.

Where the groove is arranged within the pressure ring, the loose ring in the groove must be of a smaller diameter than the bottom of the groove.

Other and further objects, features and advantages of the invention will be apparent from the following description when read in conjunction with the accompanying drawings, which show several preferred embodiments of the invention, by way of illustration only and of which:

Fig. 1 is an elevation of the complete press partly in section, the main frame of the press being partly broken away on the right hand half of the figure in order to show the cooperation of the rings and the pressure discs;

Fig. 2 is a sectional view in detail showing a modified form of the press groove having a loose ring arranged in the bottom of the groove; and Fig. 3 is a section view through the middle of a pressure disc vertical to the rotating axis of the disc.

The two press rings 1 are arranged around the two pressure discs 2 each of which is mounted in two fixed bearings 5, in such a manner that a pressure gap 7 is formed between each ring and the appertaining pressure disc. When this gap is filled with material to be briquetted, the two rings 1 are pressed together in operation. The forces exerted by the compression are taken up in a common frame 3 in which the bearings 5 are fixed, through the shafts 4 of the pressure discs 2. Now, if one of the shafts 4 is set in rotation by a gear of any desired construction and simultaneously material is supplied from the filling member 10 through chutes 11, the two rings 1 and the second non-driven pressure disc are rotated under action of the pressure resulting in the pressure gap and of the friction of the two rings. Thus an endless strand of briquettes is produced in the two pressure gaps 7.

As shown in Fig. 2 for producing this briquette strand a groove is provided in the circumference of the pressure disc 2 while the ring 1 has a rim 14 engaging the groove in such a manner that the briquette is formed in the gap 7. In order to eject the briquettes from the grooves, a spur 9 is provided which fills the groove on one side and also prevents the material supplied by the chute 11 from failing downward in the groove in a direction contrary to the rotation of the pressure disc. The briquettes fall into the funnel 15 from which they are delivered by means of the chute 8 to a conveyor of conventional type, for instance, a conveyor belt.

In order to regulate the compressive power and the thickness of the briquettes, supporting rollers 6 are provided underneath the rings 1, in such a manner that they act upon the ring approximately perpendicularly to a line connecting the centres of the pressure discs. The supporting rollers 6 are mounted on pistons moved by hydraulic forces whereby a uniform pressure can be exerted upon the material to be briquetted independently of the filling of the pressure gap. By increasing the pressure of the hydraulic liquid, a higher pressure is exerted upon the rollers 6 through the pistons 13 slidable in the cylinders 12 and thereby, by raising the rings 1 in an upward direction, the pressure gaps are constricted with increasing compressive power until the power and the pressure exerted by the rollers 6 are again in balance.

In the groove formed in the pressure disc and shown in Fig. 2 one half of the base of the groove is formed by an inserted ring 16 which has a larger diameter than the base of the groove. By rotation of the pressure disc 2, the rims 14 of the rings 1 are first drawn out of the groove and on further rotation the loose ring 16 emerges from the base of the groove and forces the briquette out of the groove. The ring 16 then returns into the groove under action of the pressure of the press on further rotation of the pressure disc.

By a lateral recess or depression 17a in the side wall of the groove at the point 17 opposite the ring 16 the briquette is retained at this point which sets as a pivot point for the briquette and its removal from the groove is thus facilitated.

In operation the briquette is formed in the pressure gap or molding space 7, the ring 16 being pushed to the base of the groove to the greatest possible extend. As the disc 2 and ring 1 rotate, the ring 16 will gradually extend outwardly from the base of the groove due to its greater diameter. This will push the briquette which will be retained and pivoted at the point 17 by being held in the recess or depression 17a. This will cause the briquette to be pivoted or rolled out of the groove in a very neat and efficient manner. It will be understood that by the invention a greatly simplified apparatus has been provided for the briquetting of fine-grained material which allows it to operate at extremely high pressures. Simultaneously the amount of material required is substantially reduced and the reliability of the operation is increased.

Fig. 3 better illustrates how the inserted ring 16 emerges at the highest point of pressure of the side opposite from the slot of the pressure disc. 2. In this manner, the briquettes are pressed out so that they may fall, for example, by the spur 9 into the runway 15.

While the invention has been described in detail with respect to certain preferred examples it will be understood by those skilled in the art that various changes and modifications may be made without departing from the spirit and scope of the invention and it is intended, therefore, to cover all such changes and modifications in the appended claims.

What I claim is:

1. Briquette molding press comprising two spaced-apart pressure discs positioned for rotation in substantially the same plane, a separate mold ring freely mounted about each said disc, said mold rings being positioned in outer peripheral surface contact with each other between said pressure discs whereby each ring acts as a pressure bearing for the other ring, each said disc being eccentrically positioned with respect to its associated ring for molding engagement with the inner surface thereof at a place on the inner surface of said ring between said pressure discs, and means for imparting rotary motion to said rings and discs.

2. Briquette molding press according to claim 1, in which at least one of said mold rings is supported in peripheral surface contact with an auxiliary roller positioned with its axis in substantial perpendicular alignment with the center of said ring.

3. Briquette molding press according to claim 2, in which said supporting roller is resiliently mounted in peripheral surface contact with said ring.

4. Briquette molding press according to claim 1, in which said means for imparting rotary motion to said rings and discs consists of drive means positioned for imparting rotary motion to one of said pressure discs.

5. Briquette molding press according to claim 1, in which said pressure discs have a molding groove defined around the periphery thereof, and including a ring of larger diameter than the inner diameter of said groove freely mounted in said groove.

6. Briquette molding press according to claim 5, in which said groove has a deeper portion defined annularly around one side thereof for the seating of the portion of said ring at said place of molding engagement of said pressure discs and mold rings therein.

7. Briquette molding press according to claim 6, in which one side wall of said groove has a recess for the retaining of briquetted material thereon.

References Cited in the file of this patent

UNITED STATES PATENTS

| | | |
|---|---|---|
| 2,413,299 | Snow | Dec. 10, 1946 |
| 2,558,693 | Roubal | June 26, 1951 |

FOREIGN PATENTS

| | | |
|---|---|---|
| 549,937 | Germany | May 3, 1932 |
| 577,517 | Germany | June 1, 1933 |
| 474,780 | Great Britain | Nov. 8, 1937 |